(12) United States Patent
Bae et al.

(10) Patent No.: US 10,135,895 B2
(45) Date of Patent: Nov. 20, 2018

(54) METHOD AND APPARATUS FOR REPEATEDLY TRANSMITTING SEGMENT BASED BROADCASTING CONTENTS

(71) Applicant: ELECTRONICS AND TELECOMMUNICATIONS RESEARCH INSTITUTE, Daejeon (KR)

(72) Inventors: Byung Jun Bae, Daejeon (KR); Hye Ju Oh, Daejeon (KR); Hyun Jeong Yim, Daejeon (KR); Soon Choul Kim, Daejeon (KR); Hyoung Soo Lim, Daejeon (KR); Nam Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 119 days.

(21) Appl. No.: 15/083,388

(22) Filed: Mar. 29, 2016

(65) Prior Publication Data

US 2017/0099335 A1    Apr. 6, 2017

(30) Foreign Application Priority Data

Oct. 6, 2015 (KR) ........................ 10-2015-0140339

(51) Int. Cl.
  *G06F 15/16* (2006.01)
  *H04L 29/06* (2006.01)
  *H04L 29/08* (2006.01)

(52) U.S. Cl.
  CPC ........ *H04L 65/601* (2013.01); *H04L 65/4076* (2013.01); *H04L 67/02* (2013.01); *H04L 67/06* (2013.01)

(58) Field of Classification Search
  None
  See application file for complete search history.

(56) References Cited

U.S. PATENT DOCUMENTS 7,301,994 B2    11/2007 Park et al.
8,234,350 B1 *  7/2012 Gu ................. H04N 21/234309
                                                709/203

(Continued)

FOREIGN PATENT DOCUMENTS

KR    10-2012-0078718    7/2012
KR    10-2015-0105381    9/2015

OTHER PUBLICATIONS

Byungjun Bae et al., "Contents Repetition Generation for developing DASH Segment Based Broadcasting Services and Systems", 2015 Korean Society of Broadcast Engineers Summer Conference, Jul. 2, 2015.

*Primary Examiner* — Umar Cheema
*Assistant Examiner* — Gregory P Tolchinsky
(74) *Attorney, Agent, or Firm* — Kile Park Reed & Houtteman PLLC

(57) ABSTRACT

The present invention relates to a method and an apparatus for transmitting broadcasting contents which repeatedly transmits segment based broadcasting contents to easily develop next generation broadcasting service and system so that it looks as if the contents are continuously reproduced even when contents having a limited capacity are repeatedly reproduced and a test environment which is the same as an actual broadcasting environment is provided.

14 Claims, 8 Drawing Sheets

(56) References Cited

U.S. PATENT DOCUMENTS

| | | | |
|---|---|---|---|
| 9,426,196 B2 | 8/2016 | Stockhammer et al. | |
| 9,794,601 B2 * | 10/2017 | Li | H04N 21/234381 |
| 9,854,021 B2 * | 12/2017 | Ramamurthy | H04L 65/607 |
| 2002/0010917 A1 * | 1/2002 | Srikantan | H04L 29/06 |
| | | | 725/1 |
| 2002/0056126 A1 * | 5/2002 | Srikantan | H04L 29/06027 |
| | | | 725/87 |
| 2011/0149153 A1 | 6/2011 | Nam et al. | |
| 2012/0224592 A1 | 9/2012 | Henry et al. | |
| 2014/0025836 A1 * | 1/2014 | Gupta | H04N 21/8456 |
| | | | 709/231 |
| 2014/0059243 A1 * | 2/2014 | Reisner | H04N 21/23439 |
| | | | 709/231 |
| 2014/0143439 A1 * | 5/2014 | Ramamurthy | H04N 21/23439 |
| | | | 709/231 |
| 2014/0150019 A1 * | 5/2014 | Ma | G06Q 30/0251 |
| | | | 725/34 |
| 2014/0207907 A1 * | 7/2014 | Wang | H04L 65/602 |
| | | | 709/217 |
| 2015/0089564 A1 * | 3/2015 | Hong | H04N 13/0048 |
| | | | 725/131 |
| 2016/0248829 A1 * | 8/2016 | Bassiouny | H04L 65/4076 |
| 2016/0285941 A1 * | 9/2016 | Xie | H04L 65/602 |
| 2016/0294898 A1 * | 10/2016 | Wheelock | H04L 65/4076 |
| 2016/0308934 A1 * | 10/2016 | Gholmieh | H04L 67/02 |
| 2016/0323348 A1 * | 11/2016 | Bradbury | H04L 67/02 |
| 2017/0078354 A1 * | 3/2017 | Yang | H04N 21/23439 |

\* cited by examiner

METHOD AND APPARATUS FOR REPEATEDLY TRANSMITTING SEGMENT BASED BROADCASTING CONTENTS

CROSS-REFERENCE TO RELATED APPLICATIONS

This application claims priority to and the benefit of Korean Patent Application No. 10-2015-0140339 filed in the Korean Intellectual Property Office on Oct. 6, 2015, the entire contents of which are incorporated herein by reference.

TECHNICAL FIELD

The present invention relates to a method and an apparatus for repeatedly transmitting broadcasting contents, and more particularly, to a method and an apparatus for repeatedly transmitting segment based broadcasting contents to be continuously reproduced in order to easily develop a next-generation broadcasting service and system.

BACKGROUND ART

Currently, most digital broadcasting including a ground radio wave, a satellite, and a cable provides a service based on an MPEG-2 system technique. In order to utilize the MPEG-2 system techniques to develop a service and system, a transmitting system such as an encoder or a multiplexer is basically required. However, it is difficult to realistically build an entire system in view of cost. Therefore, equipment which transmits an MPEG-2 stream which is formed in advance is utilized.

However, a broadcasting transmitting system is basically designed to continuously transmit an encoded stream from the encoder to a receiving terminal without having any interruption so that when a test stream having a limited capacity is used, the same environment as an actual broadcasting transmitting system is not provided. There may be no problems if a reproducing duration of the test stream is set to be very long or the test is performed only for the reproducing duration, but this may cause lots of inconvenience to developers.

Even though there is a related art which repeatedly transmits the test stream having a limited capacity, the related art has a problem in that discontinuous time is generated at a moment when the test stream is repeatedly transmitted so that the repeatedly reproduced stream does not look like a continuous stream but interruption is caused. Even though MPEG-2 TS solves a problem of interruption of the stream due to the repeated reproduction, when next-generation broadcasting which is being discussed uses a segment and IP instead of MPEG-2 TS, the same problem is expected. Therefore, it is required to solve the above problem.

SUMMARY OF THE INVENTION

The present invention has been made in an effort to provide a method and an apparatus for transmitting broadcasting contents which repeatedly transmits segment based broadcasting contents to easily develop next generation broadcasting service and system so that even when contents having a limited capacity are repeatedly reproduced, it looks as if the contents are continuously reproduced and a test environment which is the same as an actual broadcasting environment is provided.

Technical objects of the present invention are not limited to the aforementioned technical objects and other technical objects which are not mentioned will be apparently appreciated by those skilled in the art from the following description.

An exemplary embodiment of the present invention provides an apparatus for transmitting segment based broadcasting contents in a broadcasting transmitting system, including: a storage which stores an original segment file; a correcting unit which reads and analyzes a configuration information file including overall configuration information of the original segment file from the storage to correct corresponding available start time information to a current transmission time; an initialization segment analyzing unit which reads an initialization segment file including track information of a corresponding media segment file for the original segment file from the storage; a media segment correcting unit which reads and analyzes the media segment file from the storage and corrects a sequence number of the fragment and a media decode time included in the media segment file to be numbered to be continuously increased, by referring to the track information; and a file correcting and transmitting unit which generates an output segment file including the corrected configuration information file, the initialization segment file, and the corrected media segment file.

The original segment file may be a dynamic adaptive streaming over HTTP (DASH) segment file and the configuration information file may be a media presentation description (MPD) file.

The correcting unit may set the current transmission time based on a universal time coordinated.

The track information may include a reproduction duration of each fragment and a count value of the number of media included in the media segment file.

The media segment correcting unit may correct the media decode time of each fragment by cumulatively adding values obtained by multiplying a media reproduction duration of each fragment and the count value included in the track information.

The media segment correcting unit may correct the media decode time of each fragment by cumulatively adding a media reproduction duration of each fragment included in the track information.

The file correcting and transmitting unit may generate a corresponding output segment file for each of a plurality of media segment files of the original segment file such that sequence information of a name of the corrected media segment file is numbered to be continuously increased.

The media segment correcting unit may assign numbers to files before and after the plurality of output segment files which is sequentially repeatedly generated such that the sequence number of each fragment and the media decode time included in the media segment file are numbered to be continuously increased.

Another exemplary embodiment of the present invention provides a method for transmitting segment based broadcasting contents in a broadcasting transmitting system, including: storing an original segment file in a storage; reading and analyzing a configuration information file including overall configuration information of the original segment file from the storage to correct corresponding available start time information to a current transmission time; reading an initialization segment file including track information of a media segment file for the original segment file from the storage; reading and analyzing the media segment file from the storage and correcting a sequence number of the fragment and a media decode time included in the media segment file to be numbered to be continuously increased, by referring to the track information; and generating an output segment file including the corrected configuration information file, the initialization segment file, and the corrected media segment file.

The original segment file may be a dynamic adaptive streaming over HTTP (DASH) segment file and the configuration information file may be a media presentation description (MPD) file.

In the correcting of the available start time information to the current transmission time, the current transmission time may be set based on a universal time coordinated.

The track information may include a reproduction duration of each fragment and a count value of the number of media included in the media segment file.

In the correcting of a sequence number of the fragment and a media decode time included in the media segment file to be numbered to be continuously increased, the media decode time of each fragment may be corrected by cumulatively adding values obtained by multiplying a media reproduction duration of each fragment and the count value included in the track information.

In the correcting of a sequence number of the fragment and a media decode time included in the media segment file to be numbered to be continuously increased, the media decode time of each fragment may be corrected by cumulatively adding a media reproduction duration of each fragment included in the track information.

In the generating of the output segment file, a corresponding output segment file may be generated for each of a plurality of media segment files of the original segment file such that sequence information of a name of the corrected media segment file is numbered to be continuously increased.

In the correcting of a sequence number of the fragment and a media decode time included in the media segment file to be numbered to be continuously increased, numbers may be assigned to files before and after the plurality of output segment files which is sequentially repeatedly generated such that the sequence number of each fragment and the media decode time included in the media segment file are numbered to be continuously increased.

According to the method and apparatus for repeatedly transmitting segment based broadcasting contents according to the present invention, the segment based broadcasting contents are repeatedly transmitted, so that even though the contents having a limited capacity are repeatedly reproduced, it looks as if the contents are continuously reproduced and a test environment which is the same as the actual broadcasting environment may be provided.

In an introducing step of a segment based next generation broadcasting service, new service and system development may be easily and conveniently supported at a low cost.

In ATSC 3.0 which pushes standardization of a next generation broadcasting technology of United States, the existing MPEG-2 stream is excluded and segment and IP based large quantity broadcasting contents transmission is discussed. In this context, when the segment and IP based next generation broadcasting service and system are developed, the method and the apparatus for repeatedly transmitting segment based broadcasting contents according to the present invention may be efficiently used so that it looks as if the contents are continuously reproduced by repeatedly reproducing the broadcasting content.

Figure 1A:
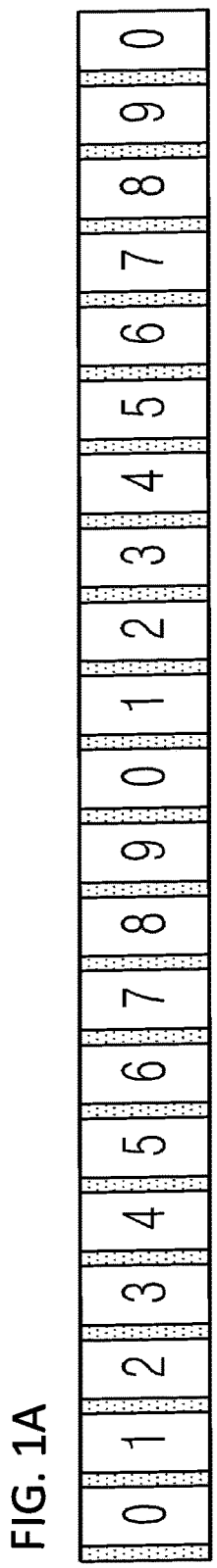
FIG. 1A illustrates an example of repeated transmission concept of an MPEG-2 stream for a test in a general broadcasting transmitting system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some embodiments of the present invention will be described in detail with reference to the accompanying drawings. When reference numerals denote components in the drawings, even though the like parts are illustrated in different drawings, it should be understood that like reference numerals refer to the same parts. In describing the embodiments of the present invention, when it is determined that the detailed description of the known configuration or function related to the present invention may obscure the understanding of embodiments of the present invention, the detailed description thereof will be omitted.

In describing components of the exemplary embodiment of the present invention, terminologies such as first, second, A, B, (a), (b), and the like may be used. However, such terminologies are used only to distinguish a component from another component but nature, a sequence or an order of the component is not limited by the terminologies. If it is not contrarily defined, all terminologies used herein including technological or scientific terms have the same meaning as those generally understood by a person with ordinary skill in the art. Terminologies which are defined in a generally used dictionary should be interpreted to have the same meaning as the meaning in the context of the related art but are not interpreted as ideal or excessively formal meaning if they are not clearly defined in the present invention.

First, FIG. 1A illustrates an example of repeated transmission concept of an MPEG-2 stream for a test in a general broadcasting transmitting system. In some cases, a method which repeatedly transmits MPEG-2 streams 0 to 9 to repeatedly reproduce the streams as illustrated in FIG. 1A is used, but discontinuous time is generated at a moment when the streams are repeatedly transmitted, so that the streams do not look like a continuous stream.

Figure 1B:
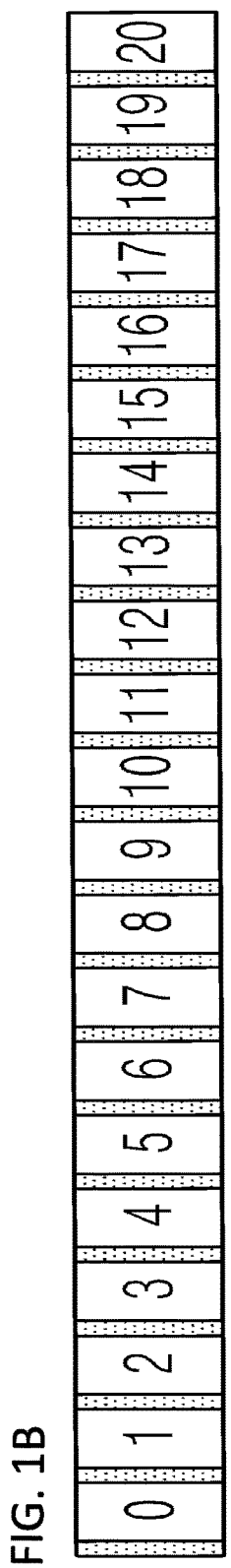
FIG. 1B illustrates another example of repeated transmission concept of an MPEG-2 stream for a test in a general broadcasting transmitting system.

FIG. 1B illustrates another example of repeated transmission concept of an MPEG-2 stream for a test in a general broadcasting transmitting system. As illustrated in FIG. 1B, an MPEG-2 stream to be transmitted is corrected to be a repeated continuous stream and the corrected stream is transmitted, so that the stream is reproduced to look like a continuous stream.

Figure 2:
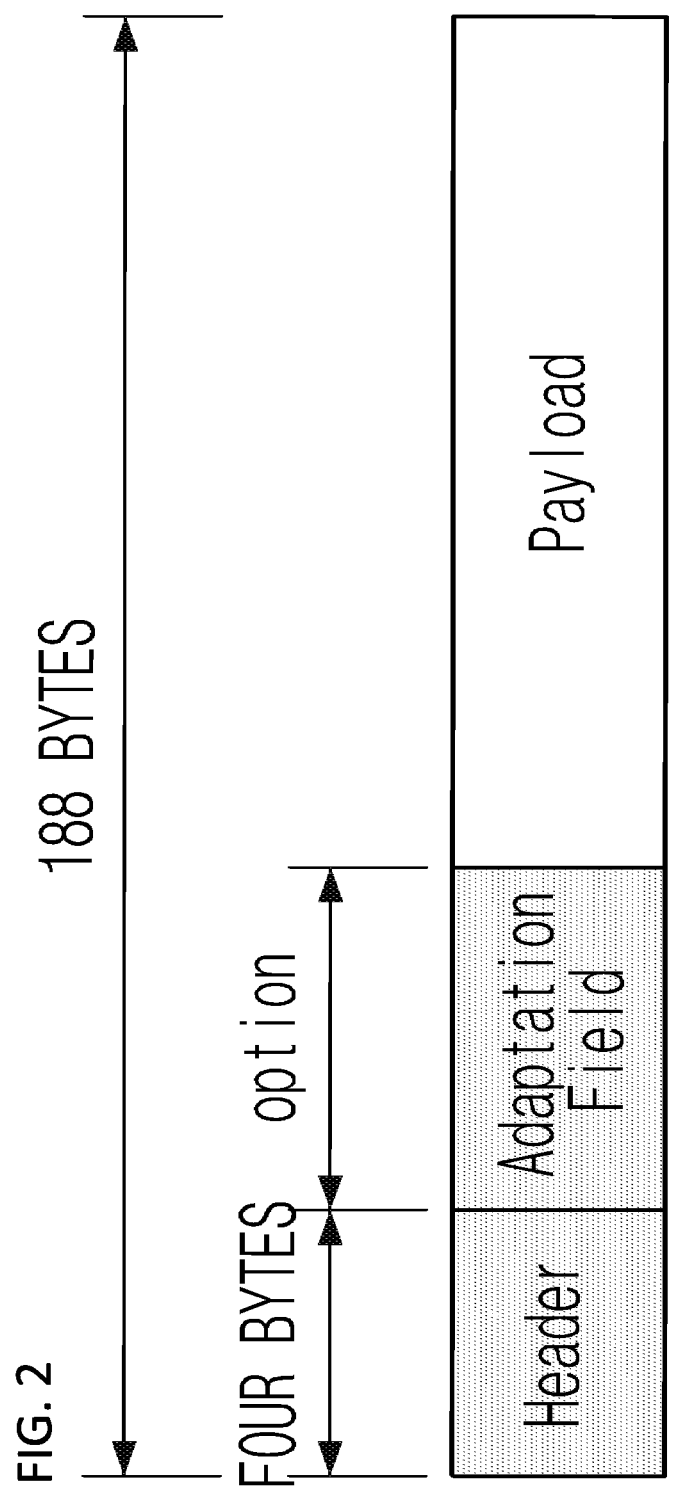
FIG. 2 is a view of a configuration of a general MPEG-2 stream.

FIG. 2 is a view of a configuration of a general MPEG-2 stream. As illustrated in FIG. 2, the MPEG-2 stream is configured by a four-byte header and a 184-byte payload and a specific stream selectively has an adaptation field section. In the adaption field section, a program clock reference (PCR) which is the most important time information in the MPEG-2 system is included.

Current digital broadcasting synchronizes transmission/reception clocks based on a PCR value and reproduces video and audio contents included in the stream. Therefore, in order to make the repeatedly reproduced stream look like a continuous stream, a discontinuous PCR value which is generated at the moment of repeatedly transmitting the stream is corrected to be a continuous value and a continuity counter value of the stream needs to be continuously increased. Further, a decoding time stamp (DTS) and a presentation time stamp (PTS) which are included in a header section of a packetized elementary stream (PES) which is a prior step of the configuration of the MPEG stream and notify a decoding time and a reproducing time are also corrected in accordance with the corrected PCR value. The discontinuity of the stream which is generated at the time of a repeated transmission looks like the continuous stream through the above correction.

Specifically, hereinafter, in the present invention, a case when a dynamic adaptive streaming over HTTP (Hyper Text Transfer Protocol) (DASH) segment based contents are transmitted will be described as an example. That is, the present invention suggests an apparatus and a method which corrects a broadcasting contents stream to be transmitted to be a repeated continuous stream and transmits the corrected stream so that the repeatedly reproduced stream looks like a continuous stream, in order to develop a DASH segment based next generation broadcasting service and system.

Hereinafter, a basic function of a DASH will be described first.

The basic function of a DASH is to transmit already-made file based contents with various transmission capacities in accordance with a state of a network in a communication network. Therefore, the DASH corresponds to a contents producing and transmitting technology which is operated based on a transmission control protocol (TCP) based bidirectivity. However, the DASH in the broadcasting service focuses on splitting contents in a small file (segment) unit through a determined network to send related configuration information in one direction rather than a function which changes a kind of contents to be sent in accordance with a state of the network. Therefore, the DASH in the broadcasting always simultaneously and consistently transmits a media presentation description (MPD) file which is overall configuration information and a media segment file including a segmented media (broadcasting contents) so as to continuously transmit and reproduce the contents together with the MPEG-2 stream. Further, an initialization segment value which is a reference point of segmented media files is always transmitted together in consideration of random access in a receiving terminal.

In consideration of a DASH characteristic in the broadcasting, in order to make DASH segments which have been already produced look like continuous segments while repeatedly transmitting the DASH segments, some contents of the DASH segment file need to be corrected.

First, available start time information availabilityStartTime which notifies start of a unit file (segment) based service in the MPD file needs to be changed to a current transmission time. When the time when the DASH segment is produced is different from a current transmission time, this may solve a problem in that a DASH client does not recognize the difference in the reception side and does not reproduce the stream. That is, differently from repeated transmission of the MPEG-2 stream, DASH segment based contents transmission highly depends on the current time, so that it is surely necessary to set the available start time information availabilityStartTime to the current time in order to use previously stored contents.

Second, in order to look like a live stream by repeatedly reproducing the already produced segment files, a sequence number and a media decode time which are included in each of the fragment in the media segment file need to be corrected to be numbered to be continuously increased. The media segment file may be configured by a plurality of fragments. Here, a media decode time of the current media fragment may be obtained by multiplying a reproducing duration of the corresponding track in a previous fragment and a count value which notifies the number of media included therein. That is, a media decode time of the current media fragment updates a media decode time value while adding values obtained by multiplying (cumulative sum) the reproducing duration of the previous media fragment and the count value. Further, the media decode time may be updated by continuously adding (cumulative sum) individual media reproducing duration for the previous fragment to the media decode time of the current fragment. That is, when the segment is repeatedly transmitted, the media decode time of the fragment may slightly vary depending on a method of configuring the segment. As a result, even though a method to be used may vary depending on the media segment file and a structure of the fragment(s) included therein, the media decode time for the media segments needs to be consistently updated regardless of the methods in order to repeatedly transmit the media segment files.

Finally, a name of the segment file needs to be corrected. When the DASH segment file is stored, the name of the media file includes a number indicating the sequence. Therefore, in order to repeatedly transmit the media segments, a file name including the number indicating the sequence needs to be corrected to be continuously increased.

Hereinafter, an apparatus and a method for repeatedly transmitting segment based broadcasting contents in a broadcasting transmitting system according to an exemplary embodiment of the present invention will be described in detail.

Figure 3:
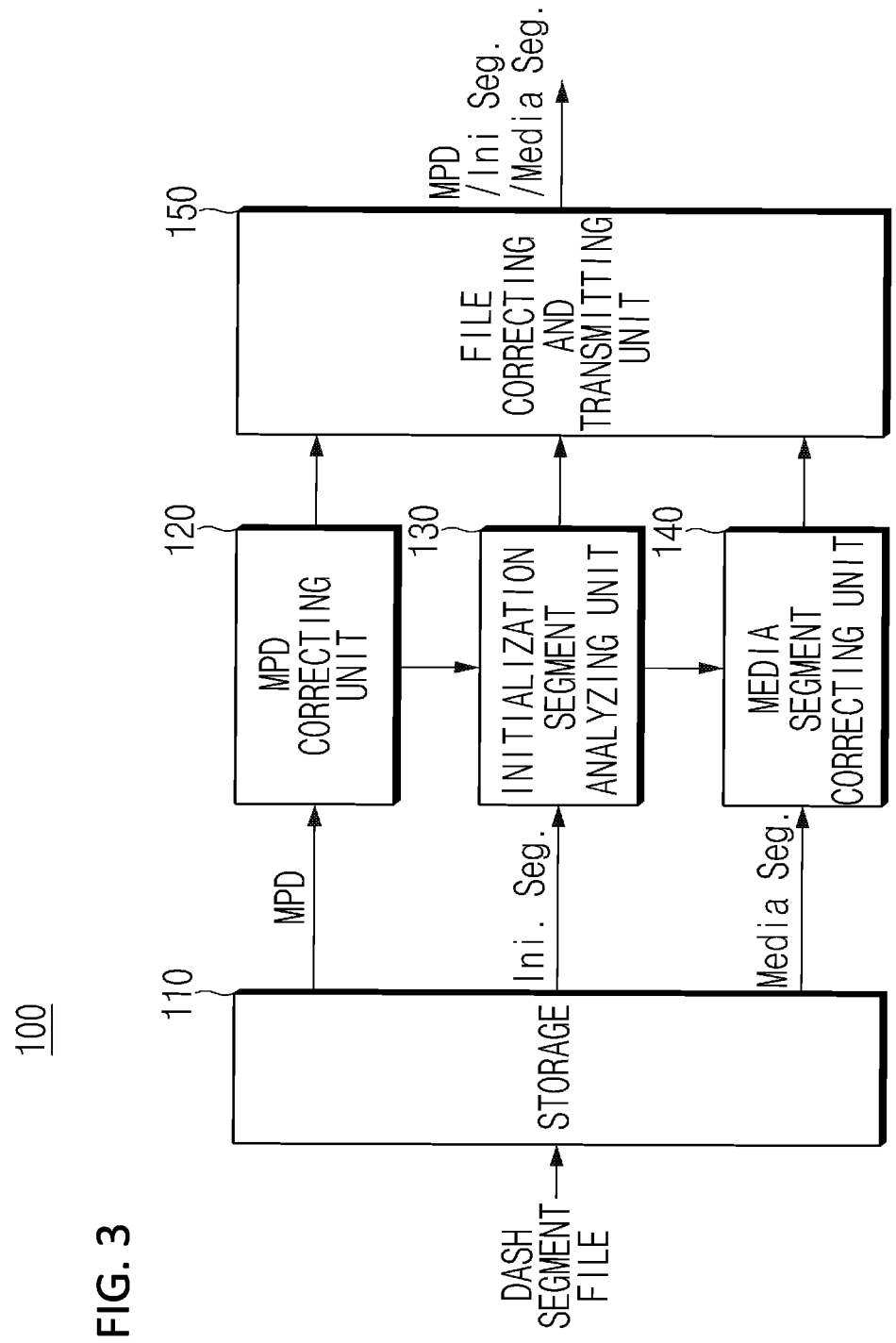
FIG. 3 is a view illustrating an apparatus for repeatedly transmitting segment based broadcasting contents in a broadcasting transmitting system according to an exemplary embodiment of the present invention.

FIG. 3 is a view illustrating an apparatus 100 for repeatedly transmitting segment based broadcasting contents in a broadcasting transmitting system according to an exemplary embodiment of the present invention. An operation of the apparatus 100 for repeatedly transmitting broadcasting contents according to an exemplary embodiment of the present invention will be described with reference to the flowchart of FIG. 4.

Referring to FIG. 3, the apparatus 100 for repeatedly transmitting broadcasting contents according to the exemplary embodiment of the present invention includes a storage 100, an MPD correcting unit 120, an initialization segment analyzing unit 130, a media segment correcting unit 140, and a file correcting and transmitting unit 150. In addition, the apparatus 100 for repeatedly transmitting broadcasting contents may further include a control unit (not illustrated) which generally controls the components.

Figure 5:
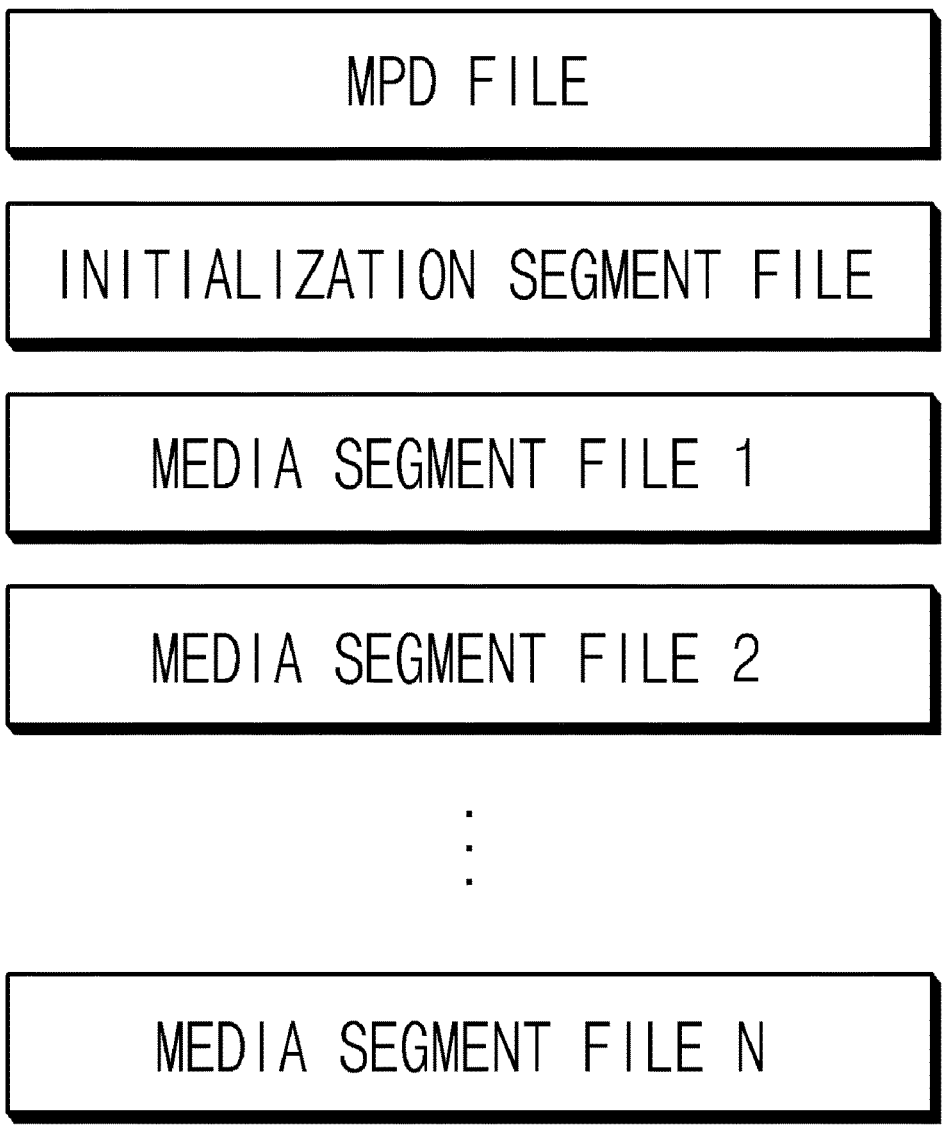
FIG. 5 is a view of a configuration of an original segment file according to an exemplary embodiment of the present invention.

The storage 110 stores an original segment file(s) (for example, a DASH segment file) which has been produced in advance. The DASH segment file includes, as illustrated in FIG. 5, an MPD file which is a configuration information file including entire configuration information (for example, availabilityStartTime, a file size, a number of media segment files) of original segment file(s) (for example, a DASH segment file), media segment files 1, 2, . . . , N including segmented media (broadcasting contents), and an initialization segment file including track information which becomes a transmission (or reproduction) criteria of the media segment files 1, 2, . . . , N.

Hereinafter, in the apparatus 100 and the method for repeatedly transmitting segment based broadcasting contents according to the exemplary embodiment of the present invention, an algorithm which repeatedly transmits contents stream to the DASH segment file will be described. However, the present invention is not limited thereto and when the contents stream is repeatedly transmitted to other segment file, the same or similar procedure as described below will be employed.

Each of the media segment files 1, 2, . . . , N is configured by a fragment(s) and the track information includes a reproducing duration of each fragment and a count value of the number of media included therein.

Figure 4:
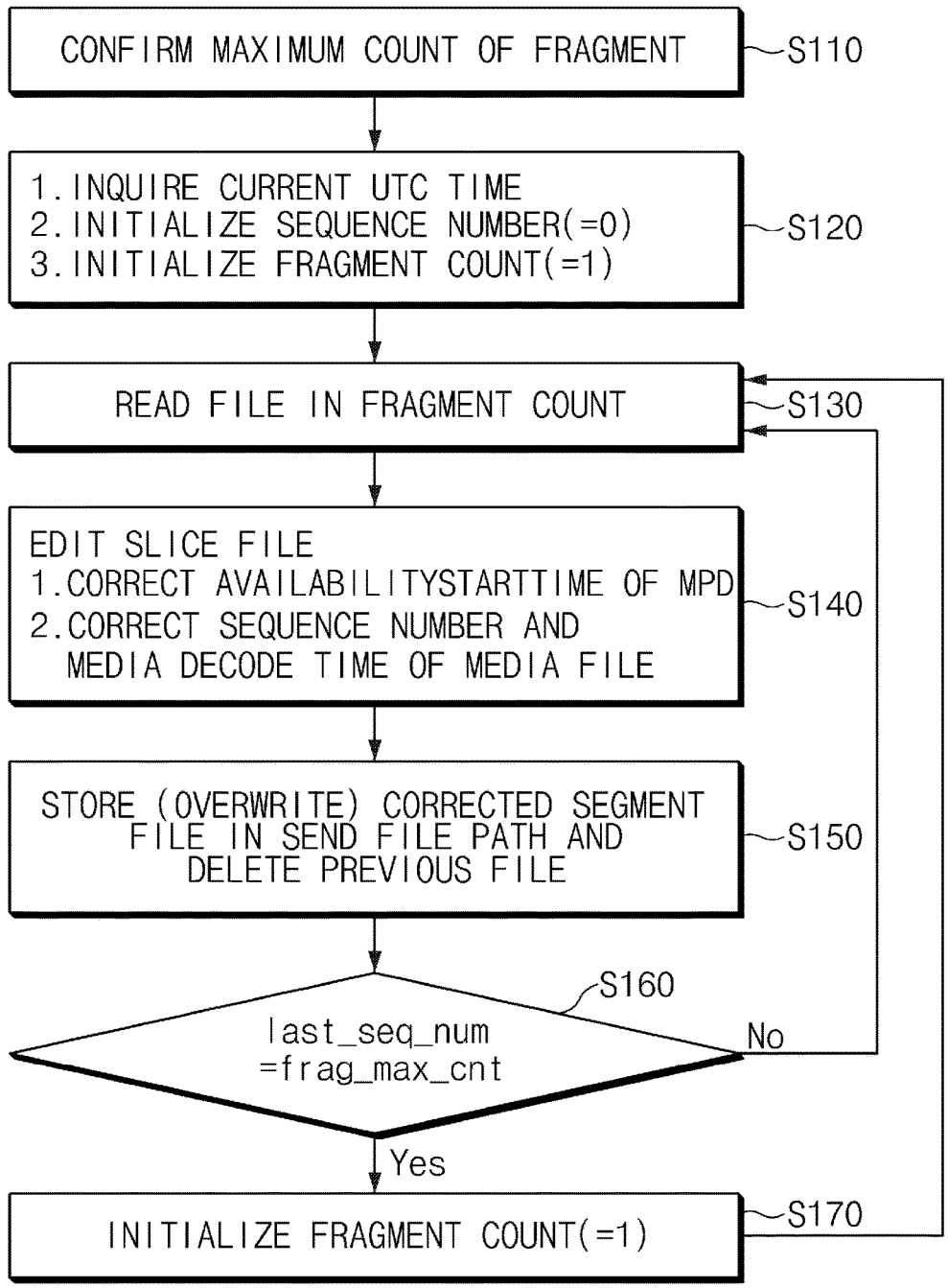
FIG. 4 is a flowchart illustrating an operation of the apparatus for repeatedly transmitting the broadcasting contents of FIG. 3.

In order to repeatedly transmit the segment based broadcasting contents in the broadcasting transmitting system using the above, the control unit confirms a maximum count value frag_max_count of the fragment(s) included in the media segment file Media.seg. to be repeated by referring to track information, with regard to an original DASH segment file to be transmitted (see S110 of FIG. 4).

The control unit inquires a predetermined universal time coordinated (UTC) for a current transmission time based on a timer, initializes a sequence number indicator and a count indicator to be 0 and 1, respectively, and stores the indicators in a storage unit such as a memory (see S120 of FIG. 4).

Figure 6:
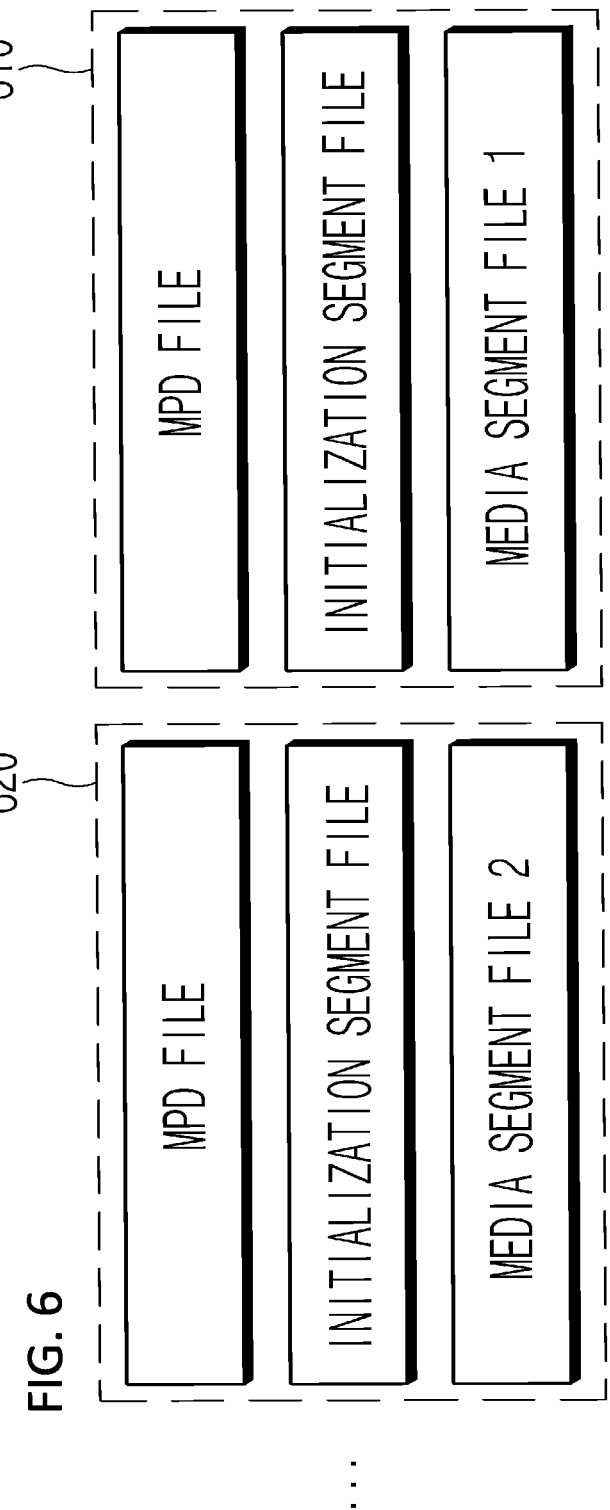
FIG. 6 is a view of a configuration of corrected output segment files according to an exemplary embodiment of the present invention.

After the initialization, the control unit increases the sequence number indicator and the count indicator by one while repeatedly performing the following steps S130 to S160 in the maximum count value frag_max_count of the fragments and reads the fragment(s) of the media segment file Media.Seg. to be repeated to perform overall control of the storage 110, the MPD correcting unit 120, the initialization segment analyzing unit 130, the media segment correcting unit 140, and the file correcting and transmitting unit 150 (see S130 of FIG. 4), thereby creating corrected output segment files to repeatedly transmit the media segment as illustrated in FIG. 6.

In accordance with the control of the control unit, the MPD correcting unit 120 reads and analyzes the MPD file for the original DASH segment file to be transmitted from the storage 110 to correct the available start time information availabilityStartTime of the MPD file which notifies the start of the service to an inquired universal time coordinated based current transmission time (see S140 of FIG. 4). Since the time when the DASH segment is produced is set in the original MPD file, the time is corrected to the current transmission time, so that the DASH client in the reception side effectively recognizes and reproduces the contents.

As described above, together with the correction of the available start time information availabilityStartTime, the initialization segment analyzing unit 130 reads the initialization segment file Ini.Seg. including track information of the media segment file Media.Seg. for the original DASH segment file to be transmitted from the storage 110 to transmit the initialization segment file to the file correcting and transmitting unit 150 and the media segment correcting unit 140.

Therefore, the media segment correcting unit 140 reads and analyzes the media segment file Media.Seg. for the original DASH segment file to be transmitted from the storage 110 and corrects the sequence number and the media decode time included in each fragment in the media segment file Media.Seg. to be numbered to be continuously increased by referring to the track information (the reproduction duration of each fragment or a count value of the number of media) (see S140 of FIG. 4).

With respect to each fragment, the sequence number is corrected to be increased by one. Further, as described above, the media decode time of each fragment may be set to have a number which is increased in the fragments using various methods such as a method of cumulatively adding values obtained by multiplying the reproducing duration of the previous media fragment and the count value or a method of cumulatively adding each media reproducing duration for the previous fragment to a media decode time of the current fragment.

The file correcting and transmitting unit 150 generates a corrected output segment file 610 including the corrected MPD file, the initialization segment file Ini.Seg., and the corrected media segment file Media.Seg. and the name of the corrected media segment file Media.Seg. includes sequence information indicating the sequence and the sequence information of the file name of next repeated output segment files 620, 630, . . . is sequence information which is numbered to be continuously increased from the previous segment file.

The file correcting and transmitting unit 150 stores the generated output segment file 610 in a predetermined send file path (for example, a transmission cue or a memory) of a sender and removes a previously stored file (see S150 of FIG. 4).

The control unit increases a sequence number indicator by 1 and controls the above steps S130 to S150 to be repeatedly performed until a value of a last sequence number indicator last sequence number becomes a maximum count frag_max_count of the fragments (see S160 of FIG. 4). The above steps S130 to S150 are repeated, so that the file correcting and transmitting unit 150 generates the output segment file 610 including the corrected MPD file, the initialization segment file Ini.Seg., and the corrected media segment file Media.Seg.

The above steps S130 to S150 may be repeated for each of the media segment files 1, 2, . . . , N to be repeated. That is, after initializing the maximum count frag_max_count of the fragments to be 1, the control unit controls the above steps S130 to S150 to be repeatedly performed until a value of a last sequence number indicator last sequence number becomes the maximum count frag_max_count of the fragments while increasing a sequence number indicator of another media segment file among the media segment files 1, 2, ..., N by one (see S170 of FIG. 4).

In accordance with the above steps, the file correcting and transmitting unit 150 sequentially generates segment files 610, 620, 630, ... including the same broadcasting contents with respect to the media segment files 1, 2, ..., N, such that a name of the media segment file Media.Seg. includes sequence information to be numbered to be continuously increased. For example, the steps are repeated M times (for example, a natural number 100) for N (natural number) media segment files 1, 2, ..., N and the sequence information of the name of the media segment file Media.Seg. may be set to be 1, 2, 3, ..., N, N+1, N+2, ... MN. When N is 10, N+1 is 11.

In this case, the media segment correcting unit 140 assigns numbers to files before and after the output segment files 610, 620, 630, ... which are sequentially repeatedly generated such that the sequence number of each fragment and the media decode time included in the media segment file is numbered to be continuously increased. Therefore, it looks as if the contents are continuously reproduced in a reception client and a test environment which is the same as the actual broadcasting environment may be provided. Further, in an introducing step of a segment based next generation broadcasting service, new service and system development may be easily and conveniently supported at a low cost.

In ATSC 3.0 which pushes standardization of a next generation broadcasting technology of United States, the existing MPEG-2 stream is excluded and segment and IP based large quantity broadcasting contents transmission is discussed. In this context, when the segment and IP based next generation broadcasting service and system are developed, the method and apparatus for repeatedly transmitting segment based broadcasting contents according to the present invention may be efficiently used so that it looks as if the contents are continuously reproduced by repeatedly reproducing the broadcasting contents.

Figure 7:
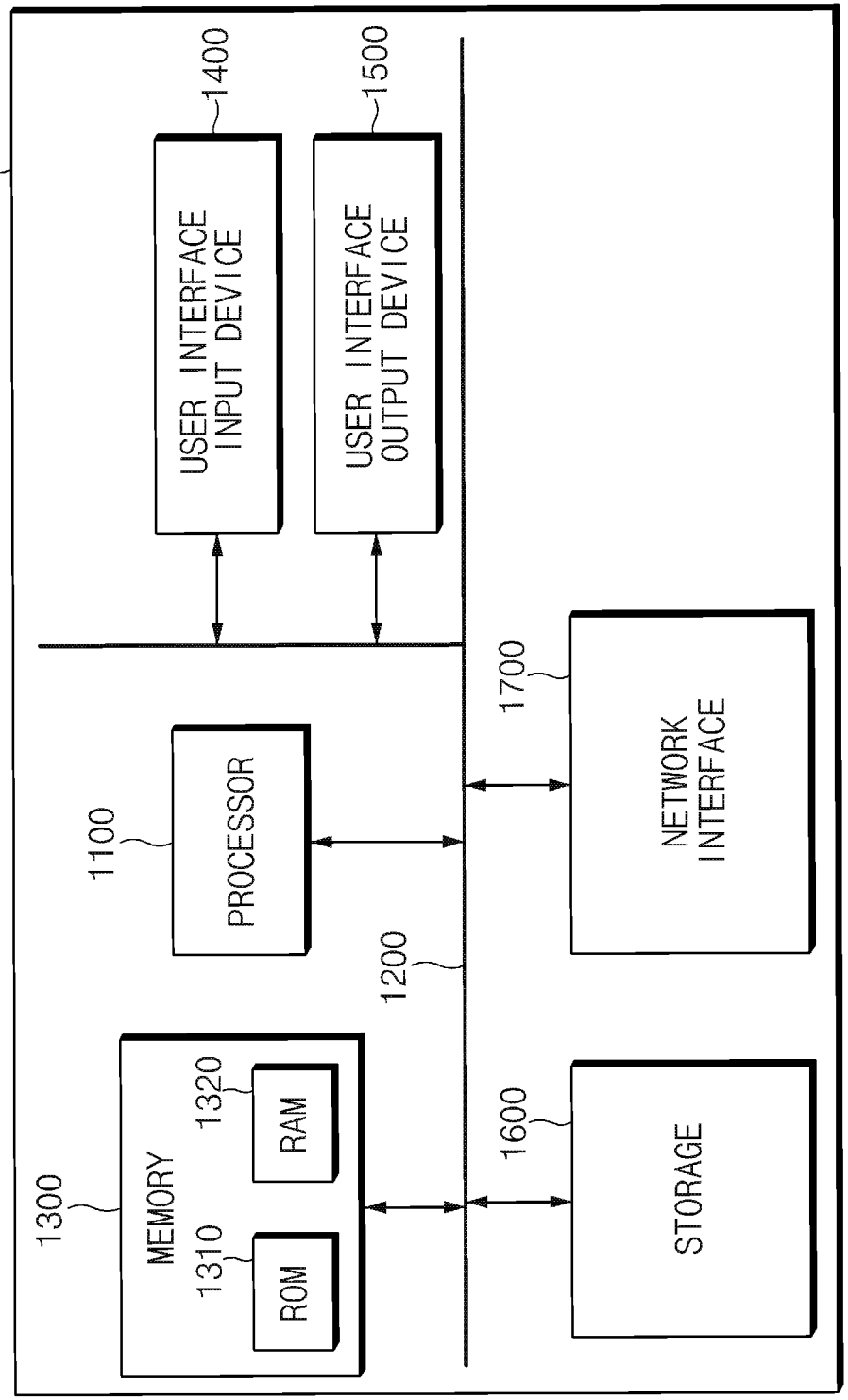
FIG. 7 is a view illustrating an example of an implementing method of an apparatus for repeatedly transmitting segment based broadcasting contents according to an exemplary embodiment of the present invention.

FIG. 7 is a view illustrating an example of an implementing method of an apparatus 100 for repeatedly transmitting segment based broadcasting contents according to an exemplary embodiment of the present invention. The apparatus 100 for repeatedly transmitting broadcasting contents according to the exemplary embodiment of the present invention may be configured by hardware, software, or a combination thereof. For example, the apparatus 100 for repeatedly transmitting broadcasting contents may be implemented by a computing system 1000 as illustrated in FIG. 7.

The computing system 1000 may include at least one processor 1100, a memory 1300, a user interface input device 1400, a user interface output device 1500, a storage 1600, and a network interface 1700 which are connected to each other through a bus 1200. The processor 1100 may be a semiconductor device which performs processings on commands which are stored in a central processing unit (CPU), or the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

The method or a step of algorithm which has been described regarding the exemplary embodiments disclosed in the specification may be directly implemented by hardware or a software module which is executed by a processor 1100 or a combination thereof. The software module may be stored in a storage medium (that is, the memory 1300 and/or the storage 1600) such as a RAM, a flash memory, a ROM, an EPROM, an EEPROM, a register, a hard disk, a detachable disk, or a CD-ROM. An exemplary storage medium is coupled to the processor 1100 and the processor 1100 may read information from the storage medium and write information in the storage medium. As another method, the storage medium may be integrated with the processor 1100. The processor and the storage medium may be stored in an application specific integrated circuit (ASIC). The ASIC may be stored in a user terminal. As another method, the processor and the storage medium may be stored in a user terminal as individual components.

It will be appreciated that various exemplary embodiments of the present invention have been described herein for purposes of illustration, and that various modifications, changes, and substitutions may be made by those skilled in the art without departing from the scope and spirit of the present invention.

Accordingly, the exemplary embodiments disclosed herein are intended to not limit but describe the technical spirit of the present invention and the scope of the technical spirit of the present invention is not restricted by the exemplary embodiments. The protection scope of the present invention should be interpreted based on the following appended claims and it should be appreciated that all technical spirits included within a range equivalent thereto are included in the protection scope of the present invention.

What is claimed is:

1. An apparatus for transmitting segment based broadcasting contents in a broadcasting transmitting system, the apparatus comprising:
    a file storage configured to store an original segment file;
    a processor to execute:
        a correcting unit to read and analyze a configuration information file including overall configuration information of the original segment file from the file storage to correct corresponding available start time information to a current transmission time;
        an initializing unit to analyze an initialization segment file including track information of a media segment file for the original segment file from the file storage;
        a media segment correcting unit to read and analyze the media segment file from the file storage and corrects a sequence number of a fragment, wherein the media segment file includes a media decode time which is numbered and continuously increased by referring to the track information; and
        a file correcting and transmitting unit to generate an output segment file including the corrected configuration information file, the initialization segment file, and the corrected media segment file,
    wherein the media segment correcting unit is configured to set the current transmission time based on a universal time coordinated.

2. The apparatus of claim 1, wherein the original segment file is a dynamic adaptive streaming over HTTP (DASH) segment file and the configuration information file is a media presentation description (MPD) file.

3. The apparatus of claim 1, wherein the track information includes a reproduction duration of each fragment and a count value of the number of media included in the media segment file.

4. The apparatus of claim 1, wherein the media segment correcting unit is configured to correct the media decode time of each fragment by cumulatively adding values obtained by multiplying a media reproduction duration of each fragment and the count value included in the track information.

5. The apparatus of claim 1, wherein the media segment correcting unit is configured to correct the media decode time of each fragment by cumulatively adding a media reproduction duration of each fragment included in the track information.

6. The apparatus of claim 1, wherein the file correcting and transmitting unit is configured to generate a corresponding output segment file for each of a plurality of media segment files of the original segment file such that sequence information of a name of the corrected media segment file is numbered to be continuously increased.

7. The apparatus of claim 6, wherein the media segment correcting unit is configured to assign numbers to files before and after the plurality of output segment files which is sequentially repeatedly generated such that the sequence number of each fragment and the media decode time included in the media segment file are numbered to be continuously increased.

8. A method for transmitting segment based broadcasting contents in a broadcasting transmitting system, the method comprising:
  storing an original segment file in a file storage;
  reading and analyzing a configuration information file including overall configuration information of the original segment file from the file storage to correct corresponding available start time information to a current transmission time;
  reading an initialization segment file including track information of a corresponding media segment file for the original segment file from the file storage;
  reading and analyzing the media segment file from the file storage and correcting a sequence number of the fragment, where the media segment file includes a media decode time which is numbered and continuously increased by referring to the track information; and
  generating an output segment file including the corrected configuration information file, the initialization segment file, and the corrected media segment file,
  wherein in the correcting of the available start time information to the current transmission time, the current transmission time is set based on a universal time coordinated.

9. The method of claim 8, wherein the original segment file is a dynamic adaptive streaming over HTTP (DASH) segment file and the configuration information file is a media presentation description (MPD) file.

10. The method of claim 8, wherein the track information includes a reproduction duration of each fragment and a count value of the number of media included in the media segment file.

11. The method of claim 8, wherein in the correcting of a sequence number of the fragment and a media decode time included in the media segment file to be numbered to be continuously increased, the media decode time of each fragment is corrected by cumulatively adding values obtained by multiplying a media reproduction duration of each fragment and the count value included in the track information.

12. The method of claim 8, wherein in the correcting of a sequence number of the fragment and a media decode time included in the media segment file to be numbered to be continuously increased, the media decode time of each fragment is corrected by cumulatively adding a media reproduction duration of each fragment included in the track information.

13. The method of claim 8, wherein in the generating of the output segment file, a corresponding output segment file is generated for each of a plurality of media segment files of the original segment file such that sequence information of a name of the corrected media segment file is numbered to be continuously increased.

14. The method of claim 13, wherein in the correcting of a sequence number of the fragment and a media decode time included in the media segment file to be numbered to be continuously increased, numbers are assigned to files before and after the plurality of output segment files which is sequentially repeatedly generated such that the sequence number of each fragment and the media decode time included in the media segment file are numbered to be continuously increased.

* * * * *